United States Patent [19]

Morgan et al.

[11] 4,015,629
[45] Apr. 5, 1977

[54] ADJUSTABLE FLOW FLOATING WEIR ASSEMBLY

[76] Inventors: Thomas H. Morgan, P.O. Box 10604, Jackson, Miss. 39209; Wayne S. Posey, P.O. Box 1556, Forest, Miss. 39074

[22] Filed: Sept. 15, 1975

[21] Appl. No.: 613,284

[52] U.S. Cl. .............................. 137/578; 137/101.27
[51] Int. Cl.² ................... G01F 11/00; E03B 11/00
[58] Field of Search ........ 137/578, 101.27, 101.29, 137/135; 73/215, 216

[56] References Cited

UNITED STATES PATENTS

| | | | |
|---|---|---|---|
| 706,526 | 8/1902 | Carlisle | 137/578 X |
| 1,152,918 | 9/1915 | Schreiber | 137/578 X |
| 1,249,614 | 12/1917 | Gibson | 73/215 X |
| 1,875,544 | 9/1932 | Alphonso | 137/578 X |
| 2,882,928 | 4/1959 | Cogliati | 137/578 |
| 3,223,243 | 12/1965 | Muller | 137/578 X |
| 3,311,129 | 3/1967 | Binder | 137/578 |

*Primary Examiner*—William R. Cline
*Attorney, Agent, or Firm*—Dressler, Goldsmith, Clement, Gordon & Shore, Ltd.

[57] ABSTRACT

An adjustable-flow floating weir assembly is provided for regulating the flow of liquid out of a basin which receives a constant or variable flow of liquid. The weir assembly communicates with the exterior of the basin and has notches through which liquid from the basin flows into the weir assembly. The buoyancy of the weir assembly can be changed to correspondingly vary the vertical position of the weir assembly relative to the liquid level in the basin to thereby regulate the flow of liquid through the notches into the weir assembly and to the exterior of the basin.

9 Claims, 2 Drawing Figures

U.S. Patent        April 5, 1977        4,015,629
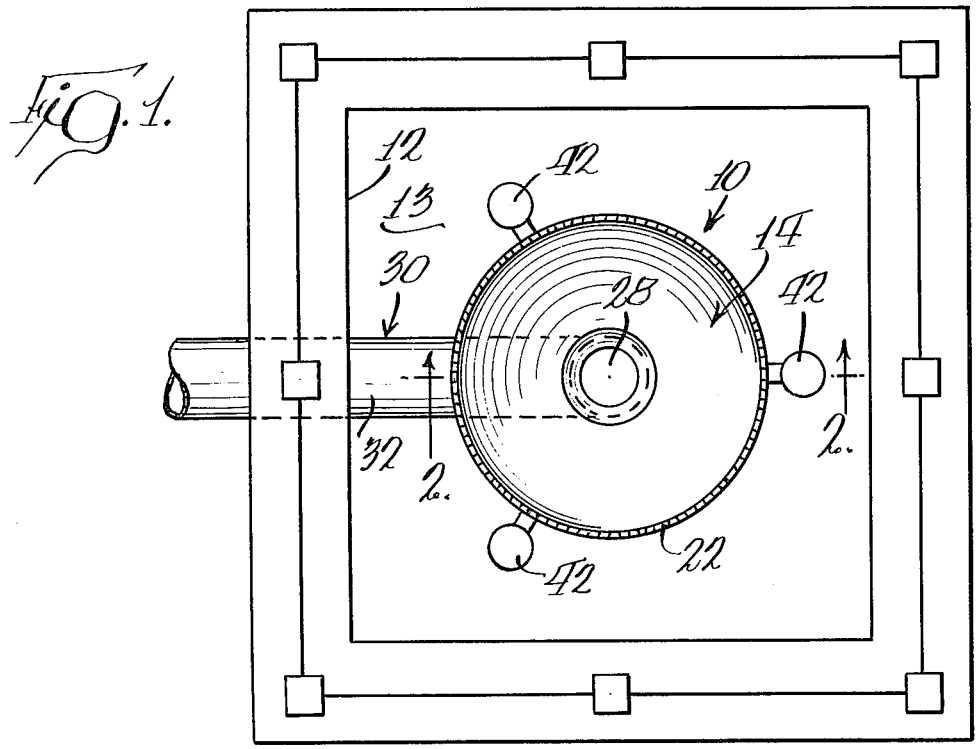
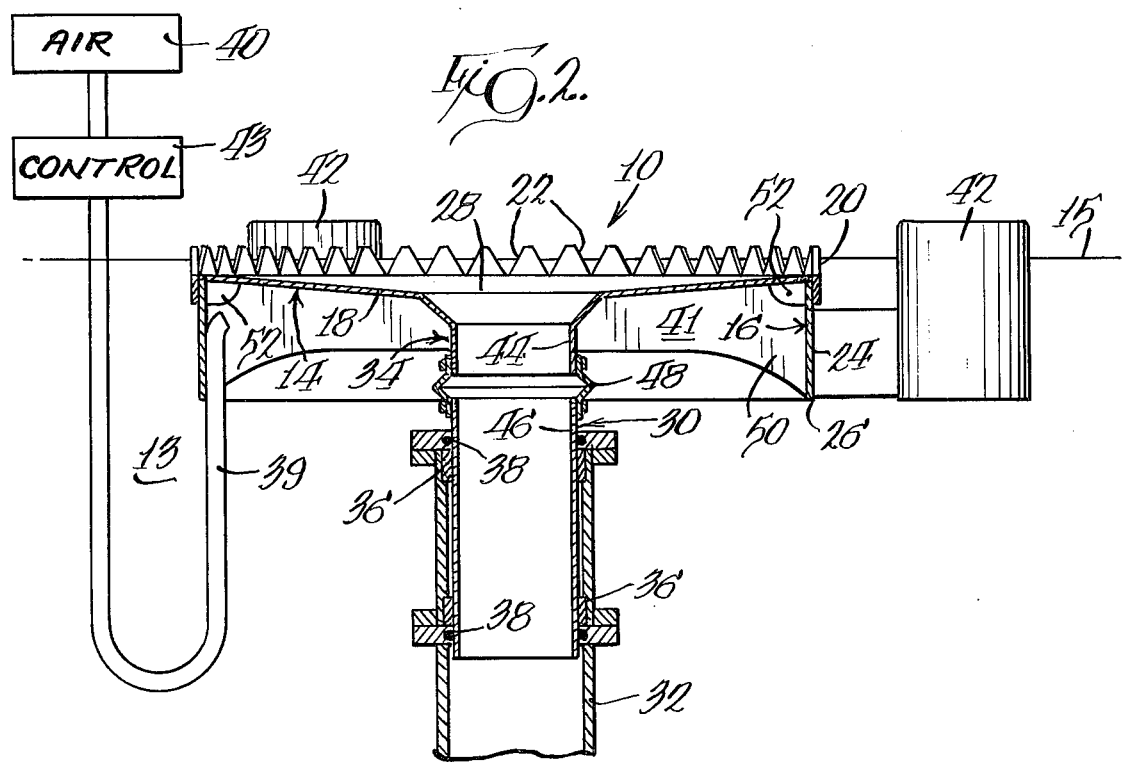

ADJUSTABLE FLOW FLOATING WEIR ASSEMBLY

BACKGROUND OF THE INVENTION

This invention relates to a weir assembly for use in a liquid-containing basin, tank or reservoir. More particularly, this invention relates to an automatically adjustable-flow floating weir assembly, which is disposed in a liquid-containing basin for regulating the flow of liquid out of the basin.

Some prior art floating weir assemblies are positioned in a body of liquid, such as a tank, and the flow of liquid through the weir assembly is always constant.

Other prior art weir assemblies are stationary in a tank, and liquid flows through such weir assemblies at a rate directly proportional to the rate at which the liquid is received in the tank.

A major problem with prior art weir assemblies is the inability to adjust the regulation of the flow of liquid out of the tank. For example, the tank in a waste water treatment plant receives a variable flow of liquid at different times during the day, and different volumes of liquid on different days. Prior art floating weir assemblies provide a constant flow of liquid and cannot be adjusted in response to different input flow conditions, such as a significantly increased volume of liquid received in the tank. Prior art stationary weir assemblies are unable to provide a constant, equalized, average volume of liquid. As a result, waste water treatment plants utilizing prior art weir assemblies have required design capacities sufficient to accommodate the highest possible flow to the tanks in the plants. This relatively high design capacity is much more expensive than the lower capacity which would suffice if the weir assemblies provided a constant, equalized volume of liquid flowing from the tank, while being adjustable to provide for a greater or lesser constant volume of liquid flowing from the tank, if desired.

SUMMARY OF THE INVENTION

An adjustable-flow floating weir assembly in accordance with the present invention solves the foregoing problems by regulating the flow of liquid out of the basin or tank in which the weir assembly is disposed. The weir assembly is buoyant, has a region which is adapted to receive air under pressure to vary the buoyancy thereof, has notches to enable liquid from the basin to flow through the weir assembly, and has a conduit which communicates with the exterior of the basin.

By varying the air under pressure acting on the underside of the weir assembly, the buoyancy of the weir assembly can be varied to correspondingly vary the vertical position of the weir assembly relative to the surface of the liquid in the basin and thereby regulate the output flow of liquid through the notches and through the weir assembly to the exterior of the basin. Thus, by maintaining a constant air pressure, the output flow of liquid from the basin would be at a constant rate since the weir assembly would always have the same elevation relative to the liquid level in the basin. By increasing or decreasing the air pressure beneath the weir assembly, the vertical position of the weir assembly can be varied relative to the liquid level in the basin to thereby increase or decrease the constant rate at which liquid flows from the basin. Thus, an adjustable-flow floating weir assembly in accordance with the present invention provides a generally equalized liquid flow at a constant rate from a basin while receiving an input flow of a constant or variable volume of liquid, while being variable to permit a change in the volume of the output flow to an increased or decreased constant rate in accordance with different input flow conditions. Of course, the output flow can also be changed as desired while the input flow remains the same.

More specifically, a weir assembly of the present invention includes a receptacle having a peripheral wall and a bottom wall. The peripheral wall has an upstanding portion extending upwardly from the bottom wall and defining a plurality of peripherally spaced notches, and a lower skirt portion which extends below the bottom wall to a lowermost edge. The bottom wall defines an opening, and conduit means communicates with the opening and connects the receptacle to the exterior of the basin. Passage means is provided for air to flow under pressure to and from the region adjacent the underside of the bottom wall of the receptacle above the lowermost edge of the skirt. Means is also provided for controlling the flow of air to enable the vertical position of the weir assembly to be varied to regulate the flow of liquid through the notches to the exterior of the basin. A plurality of stabilizer floats are secured to the receptacle to maintain the weir assembly in a level condition.

The weir assembly initially displaces a predetermined volume of liquid in the basin, and assumes an initial level which is the greatest depth that the weir assembly would have relative to the liquid level in the basin. This depth corresponds to the maximum rate at which liquid flows through the notches and the weir assembly to the exterior of the basin. When a prescribed maximum air pressure is beneath the weir assembly, the weir assembly is at a minimum depth and the output flow is at the minimum rate. It is preferable to operate the weir assembly between these two extremes under normal conditions with some air pressure so that the weir assembly is at an intermediate depth and the output flow is at an intermediate constant rate. By changing the air pressure, the depth of the weir assembly can then be changed as described to increase or decrease the constant rate of output flow.

The weir assembly of the present invention can be used to equalize the flow out of a basin which receives a variable input flow, while maintaining the ability to increase or decrease the output flow from the basin. An adjustable-flow floating weir assembly in accordance with the present invention can therefore be of substantial benefit in the design of a waste water treatment facility by significantly reducing the maximum capacity requirements of the facility, thereby resulting in substantial savings. Prior art weir assemblies cannot provide an equalized flow at a constant rate while being adjustable to handle foreseen peak rates or unforeseen exigencies at a constant rate and must therefore have capacities sufficient to accommodate the highest possible input flow. However, a lower weir capacity is possible with the present invention because the weir assembly provides an output flow at an equalized constant rate and can be regulated to change the output flow to an increased or decreased constant rate to accommodate significant changes in input flow, as desired.

BRIEF DESCRIPTION OF THE DRAWING

FIG. 1 is a plan view of the weir assembly of the present invention; and

FIG. 2 is a fragmentary cross-sectional view of the weir assembly of FIG. 1 taken along plane 2—2.

DESCRIPTION OF THE PREFERRED EMBODIMENT

Referring to FIGS. 1 and 2, an adjustable-flow floating weir assembly 10 in accordance with the present invention is provided in a liquid-containing basin 12 for regulating the flow of liquid 13 out of the basin. The basin 12 may comprise a tank or reservoir which receives an inflow of liquid at a constant or variable rate. The weir assembly 10 is buoyant and the level of the weir assembly remains constant relative to the level 15 of the liquid in the basin, but can be adjusted to vary the level of the weir assembly relative to the liquid level 15 in the basin.

The weir assembly 10 includes a receptacle 14 having a peripheral wall 16 and a bottom wall 18. The peripheral wall has an upstanding portion 20 which extends upwardly from bottom wall 18 and defines a weir which limits the quantity of liquid that flows through the weir assembly. Peripheral wall 20 has openings such as a plurality of peripherally spaced notches 22 which preferably are disposed along the upper end of upstanding wall portion 20 and preferably are generally V-shaped to facilitate in regulating the flow of liquid through weir assembly 10. The weir assembly 10 also includes a lower skirt portion 24 which extends below bottom wall 18 to a lowermost edge 26 and may comprise a portion of peripheral wall 16. Though any shape may be suitable, the weir assembly is preferably round.

The peripheral edge of bottom wall 18 is mounted to peripheral wall 16 and is sealed thereto. The bottom wall 18 defines an opening 28 which is generally centrally positioned in bottom wall 18, and the bottom wall slopes downwardly between the peripheral wall 16 and the opening 28. Conduit means 30 communicates with the opening 28 and connects the receptacle 14 to the exterior of basin 12. Conduit means 30 includes a fixed outlet pipe 32 and a telescoping floating pipe 34 which is secured to the opening 28 in the bottom wall 18. Lubricated bushings 36 are positioned between outlet pipe 32 and the telescoping floating pipe 34 to enable the floating pipe 34 to slide inside the outlet pipe 32, and o-rings 38 are positioned between pipes 32 and 34 to form a seal therebetween.

As illustrated in FIG. 2, passage means such as conduit 39 is provided for air to flow under pressure to and from the regions 41 adjacent the underside of the bottom wall 18 of the receptacle 14 above the lowermost edge 26 of skirt 24. Air flows through conduit 39 from a source 40 of compressed air, and the flow of air can be controlled as by use of a conventional flow meter and controls 43 whereby the vertical position of the weir assembly 10 can be varied to regulate the rate at which liquid flows through the notches 22 in peripheral wall 16 and through the opening 28 to the pipes 32 and 34 which communicate with the exterior of the basin 12. Thus, by maintaining a constant air pressure in the regions 41 adjacent the underside of the bottom wall 18 of the receptacle, the output flow from basin 12 will be at a constant rate; by increasing the air pressure in regions 41, the weir assembly 10 will rise relative to the level of the liquid in the basin and the output flow will be at a reduced constant rate; and by decreasing the air pressure in regions 41, the weir assembly 10 will lower relative to the level of the liquid in basin 12 and the output flow will be at an increased rate. For all of the above possibilities the input flow into the basin can be constant or variable, and the liquid level in the basin can remain at a constant level, rise or fall without affecting the rate at which the liquid flows into the weir assembly. When the air pressure in regions 41 is varied to alter the vertical position of weir assembly 10, the telescoping floating pipe 34 moves vertically relative to the fixed outlet pipe 32 and the liquid level in the basin.

Means is provided for stabilizing the position of the weir assembly 10 to ensure proper movement thereof when the buoyancy of the weir is changed by varying the air pressure in regions 41. Thus, a plurality of stabilizer buoys or floats 42 are secured to the peripheral wall 16 of the receptacle 14 and float in the liquid in basin 12. Preferably, three floats 42 are provided for the round unit as shown, which floats are equally spaced from one another to maintain the weir assembly 10 in a level condition.

The weir assembly 10 stays level in basin 12, and the floating pipe 34 is normal to the surface of the liquid in the basin. To compensate for any misalignment of the outlet pipe 32 relative to the floating pipe 34 and receptacle 14, the floating pipe 34 may comprise a pair of pipe segments 44, 46 which are connected together at a flexible joint 48.

Baffles 50 may be mounted to the skirt 24 and/or to the floating pipe 34 to further support the bottom wall 18 of receptacle 14. Baffles 50 are provided with openings 52, preferably in the uppermost portion thereof adjacent bottom wall 18 and peripheral wall 16, to permit air which is supplied to regions 41 through conduit 39 to disperse equally throughout regions 41 so that the weir assembly 10 will stay level in the liquid in basin 12.

One specific application of the weir assembly of the present invention would be to permit a constant flow of liquid to be removed from a tank or reservoir which receives a variable input flow. For example, to equalize flow in a waste water treatment plant, a large tank could be provided upstream of the treatment works and the flow would enter the tank at whatever rate it is received. As the level of liquid rises and falls in the large tank, the volume of output flow from the tank would be at a constant rate since the weir assembly would always have the same relative elevation to the liquid due to the buoyancy of the weir assembly within the tank with the telescoping floating pipe 34 moving vertically as required relative to fixed outlet pipe 32. With the present invention, the volume of liquid which flows through the notches 22 in the weir assembly can be regulated in response to different input conditions so that the output flow for a fixed period, such as 12 hours, or 24 hours, is about equal to the total input flow during the same fixed period. At any given moment, the volume of input flow may be greater or less than the volume of output flow which will result in the liquid level in the tank rising or falling, but the adjustable weir permits the output flow at a constant rate during a fixed period to equal the total volume of input flow during the period. Thus, the output flow from the tank in the waste water treatment plant can always be increased or decreased as desired, by varying the buoyancy of the weir assembly by adding or removing air to change the air pressure in regions 41. This can be accomplished manually or automatically by use of a conventional flow meter and controls 43. In addition, the flow from the tank can be varied intermittently by using a time clock with the air pressure preset to correspond to the desired volume of output flow at varying times of the day. This feature is particularly useful in waste water treatment plants where the flow into the tank varies during each day in a generally predictable pattern.

A weir assembly in accordance with the present invention having a capacity of four million gallons per day has been used in a sewage treatment plant in a city which would have required a plant capacity of eight million gallons per day with a prior art fixed weir assembly.

While this invention is susceptible of embodiment in many different forms, there is shown in the drawing and has been herein described in detail a specific embodiment of the invention, with the understanding that the present disclosure is to be considered as an exemplification of the principles of the invention and is not intended to limit the invention to the embodiment illustrated.

We claim:

1. An adjustable-flow floating weir assembly in a liquid-containing basin for regulating the flow of liquid out of said basin, comprising: a receptacle including a peripheral wall and a bottom, said wall having a peripheral portion extending upwardly from said bottom and defining at its upper edge a plurality of peripherally spaced notches and a lower peripheral non-porous skirt portion extending below said bottom to a lowermost edge, said lower skirt portion and bottom defining a chamber, said bottom defining an opening, conduit means communicating with said opening and connecting said receptacle to the exterior of said basin, passage means for air to flow under pressure to and from a region within the chamber adjacent the underside of said receptacle bottom above the lowermost edge of said skirt and means for controlling the flow of said air whereby the vertical position of said weir assembly can be varied to regulate the liquid flow through said notches to the exterior of said basin.

2. A weir assembly as set forth in claim 1 in which the conduit means includes a fixed outlet pipe and a telescoping floating pipe secured to said opening and means for sealing said telescoping pipes to prevent leakage therebetween whereby said receptacle can move relative to said outlet pipe when the air pressure introduced below said enclosure is varied to alter the vertical position of said receptacle.

3. A weir assembly as set forth in claim 1 including means for stabilizing the position of said weir assembly to ensure power movement thereof when the buoyancy of said weir is changed by varying the air pressure introduced beneath said receptacle.

4. A weir assembly as set forth in claim 3 wherein said stabilizing means comprises a plurality of floats secured to said receptacle.

5. A weir assembly as set forth in claim 3 wherein said stabilizing means comprises at least three floats which are secured to said receptacle and are equally spaced from one another.

6. A weir assembly as set forth in claim 2 wherein said floating pipe comprises a pair of pipe segments connected together at a flexible joint, the flexible joint compensating for misalignment of said outlet pipe relative to said receptacle.

7. A weir assembly as set forth in claim 1 further including baffles mounted to said skirt to further support the bottom of said receptacle, said baffles having openings to permit said air to disperse equally throughout the region adjacent the underside of said receptacle bottom.

8. A weir assembly as set forth in claim 1 wherein said notches are generally V-shaped to facilitate in regulating the flow of said liquid through said weir assembly.

9. An adjustable-flow floating weir assembly in a liquid-containing basin for regulating the flow of liquid out of said basin, comprising: a receptacle including a bottom and a peripheral wall having a peripheral portion extending upwardly from said bottom and defining notches at its upper edge to limit the flow of liquid through said weir assembly, depending peripheral non-porous baffle means sealed to said bottom and extending below said bottom to a lowermost edge defining therewith a chamber, said bottom defining an opening, conduit means communicating with said opening and connecting said receptacle to the exterior of said basin, passage means for air to flow under pressure to and from a region within the chamber adjacent the underside of said receptacle bottom above the lowermost edge of said baffle means and means for controlling the flow of said air whereby the vertical position of said weir assembly can be varied to regulate the liquid flow through said notches to the exterior of said basin.

* * * * *